United States Patent
Orednick

[11] Patent Number: 5,287,800
[45] Date of Patent: Feb. 22, 1994

[54] CATERER FOOD DISPLAY SYSTEM

[76] Inventor: J. Paul Orednick, 19 W. 450 Deerpath La., Lemont, Ill. 60439

[21] Appl. No.: 569,937

[22] Filed: Aug. 20, 1990

[51] Int. Cl.$^5$ .......................... A47J 27/00; A47F 5/01
[52] U.S. Cl. ........................................ 99/449; 99/339; 126/9 R; 211/189; 248/150; 248/153
[58] Field of Search ................ 99/449, 403, 340, 279, 99/283, 410, 411, 412, 413, 414, 415, 416, 417, 418, 339; 220/85 H; 248/150, 165, 153; 126/9 R, 9 B, 43, 389, 373; 229/121, 122; D7/355, 366, 403, 337, 354, 360; 211/133, 189, 181, 248

[56] References Cited

U.S. PATENT DOCUMENTS

| | | | |
|---|---|---|---|
| D. 189,469 | 12/1960 | Fischer | D7/366 |
| D. 213,899 | 4/1969 | Rickmeier | D7/355 |
| 539,195 | 5/1895 | Schlesinger | 211/189 |
| 1,172,355 | 2/1916 | Guest | 248/165 X |
| 1,266,588 | 5/1918 | Hanson | 126/29 X |
| 1,319,400 | 10/1919 | Loveland | 248/165 X |
| 1,393,761 | 10/1921 | Demuth | 99/403 X |
| 1,987,378 | 1/1935 | Tansley | 126/9 R X |
| 2,190,623 | 2/1940 | Benson | 248/150 |
| 3,025,849 | 3/1962 | Zimmerman | 126/9 R X |
| 3,891,137 | 6/1975 | Ellison et al. | 229/122 X |
| 4,094,417 | 6/1978 | Cairnes | 211/182 |
| 4,108,316 | 8/1978 | Slater | 248/165 X |
| 4,157,801 | 6/1979 | Elmer | 248/150 X |
| 4,191,160 | 3/1980 | Elliott | 126/9 R |
| 4,621,740 | 11/1986 | Lang | 211/133 |
| 4,667,912 | 5/1987 | DeVilbiss | 248/150 |
| 4,673,092 | 6/1987 | Lamson et al. | 248/165 X |
| 4,699,342 | 10/1987 | Bartz | 248/150 |
| 4,920,873 | 5/1990 | Stevens | 99/449 |

FOREIGN PATENT DOCUMENTS 1327100  3/1962  France ........................ 248/150

*Primary Examiner*—Harvey C. Hornsby
*Assistant Examiner*—Patrick Brinson
*Attorney, Agent, or Firm*—Laff, Whitesel, Conte & Saret

[57] ABSTRACT

A disposable system provides means for caterers to transport, serve, and display food, although the system may also be used by campers, picnickers, or the like. A plurality of bent wires and plastic legs are provided in a kit form which may be assembled into a knock-down stand for supporting disposable utensils. The plastic legs are shaped to avoid marring a supporting structure. The bent wires also support a suitable burner.

14 Claims, 4 Drawing Sheets

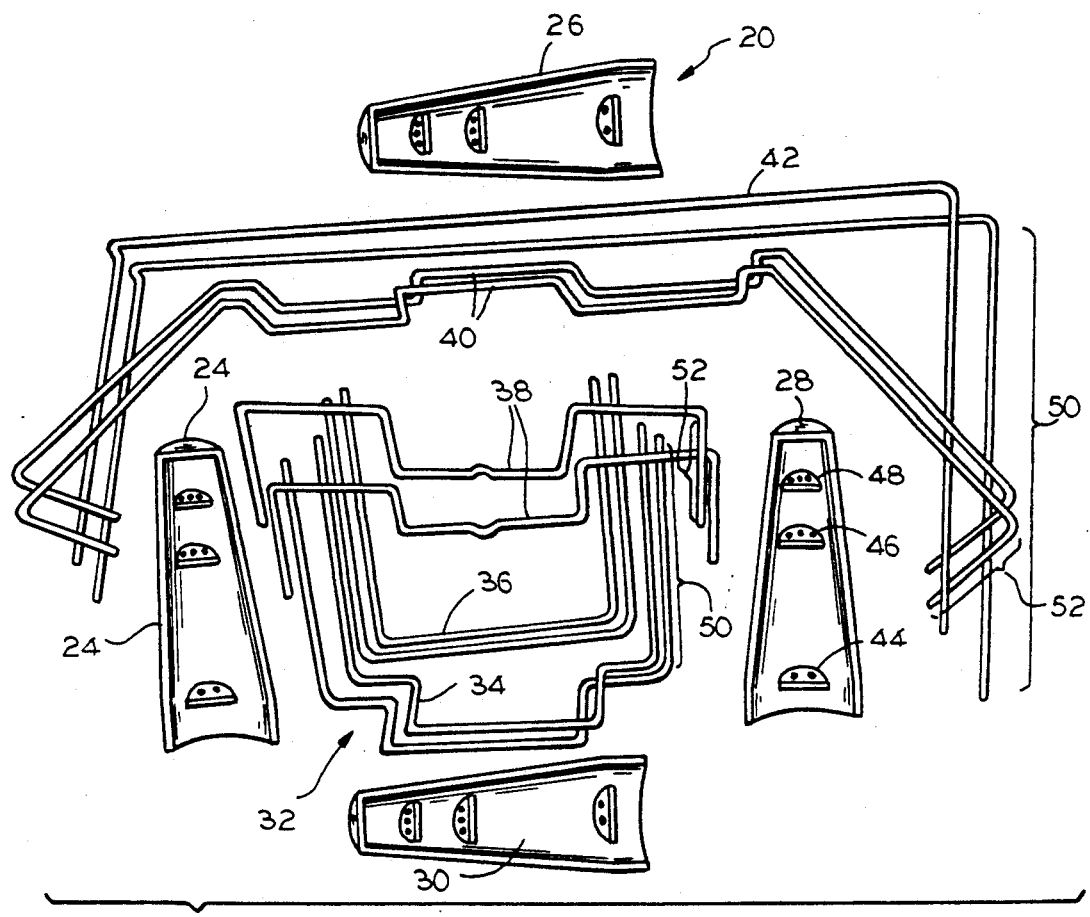
FIG.1
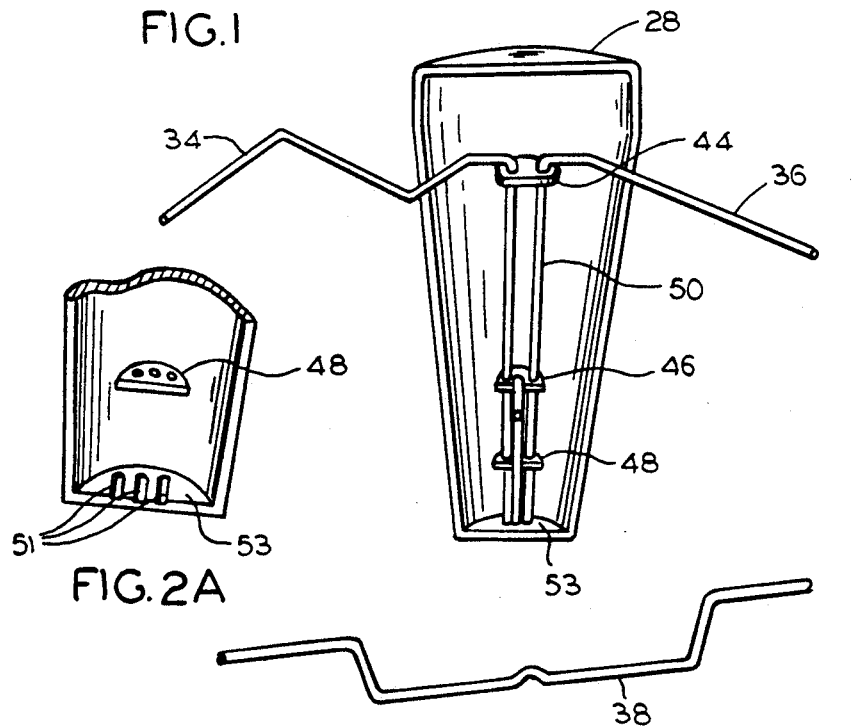
FIG.2
FIG.2A

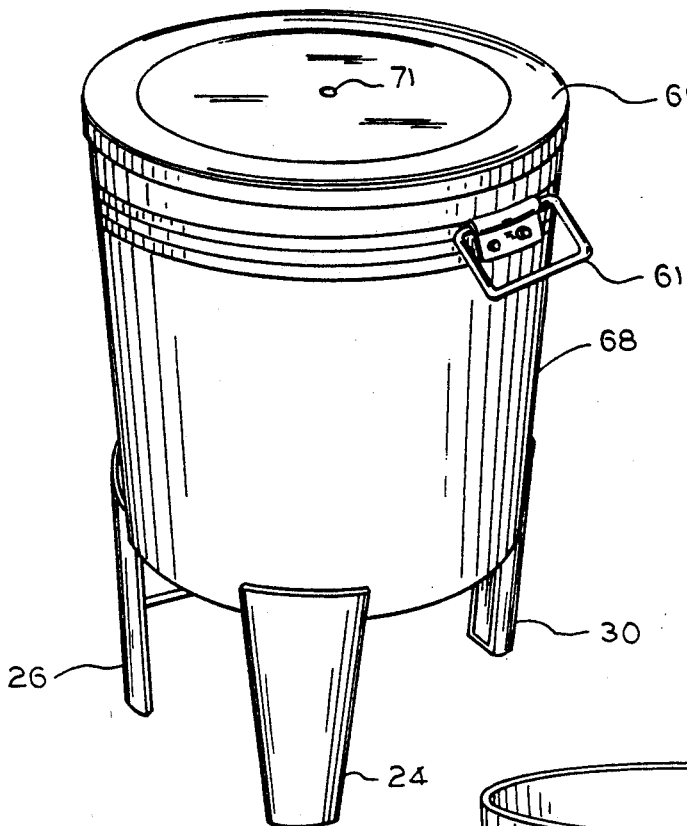
FIG. 7
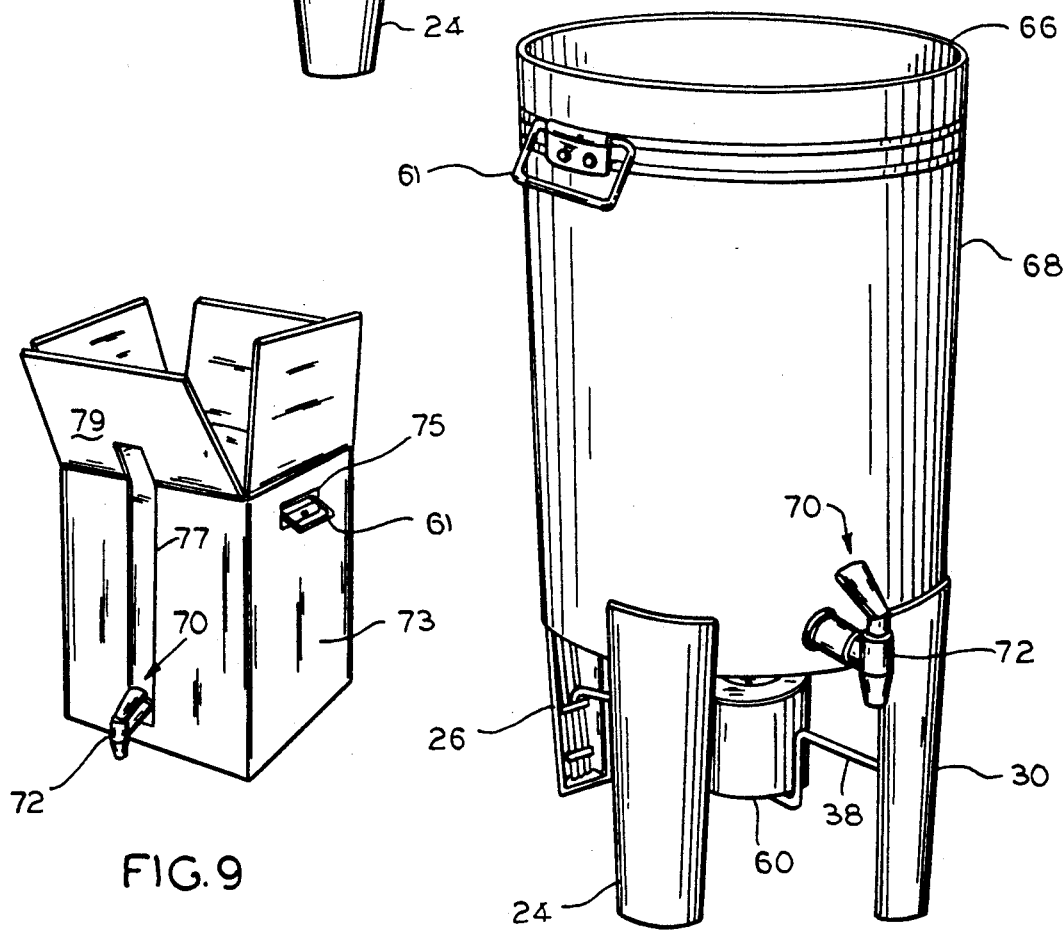
FIG. 9
FIG. 8

CATERER FOOD DISPLAY SYSTEM

This invention relates to systems for supporting, serving and displaying utensils, such as, pots, pans, urns, and the like (hereinafter "utensils") and more particularly, to such systems especially—but not exclusively—designed to be used by caterers.

The term "plastic leg" is used hereinafter for convenience of expression. The term is to be construed as any and all suitable materials such as metal legs, for example.

Catering is an art of preparing food which is usually conveyed over some distance, for consumption by others. Often the food is displayed in a buffet style so that the consumers may help themselves. Usually, the caterer must bring his own reusable utensils in order to set out and display the food to those who will consume it. Very often, there are no facilities at the point of consumption for cleaning such utensils. Therefore, the caterer must collect the dirty utensils and transport them back to his own kitchens. The caterer faces a considerable expense connected with such a clean up of the utensils in his kitchen. This also presents many other problems ranging from an inadvertent soiling of an automobile or other upholstery, through generating bacterial cultures, especially in hot weather. Finally, if there is a bacterial culture, there is always a chance that the sanitizing of the utensils, might even be less than adequate so that their next use might lead to food poisoning.

Known methods of coping with the problems described above involve a use of disposable utensils. Very often, these utensils are little more than a very heavy grade of aluminum foil which has been stamped into the form of a pan. However, such an aluminum pan radiates heat very efficiently with a result that food and beverage cools quickly. There may be nothing at the point of consumption to re-heat the cooling food. If there is a stove, it may not be appropriate to heat food in a disposable aluminum pan or other utensil. If the disposable utensils are placed on stoves of unknown heating capabilities, they could be seriously damaged and the food in them may be burned. Therefore, it might be quite unsatisfactory to try to heat them on site with unfamiliar heating appliances.

Accordingly, an object of the invention is to provide new and improved systems for use by caterers to support and display their food and beverages at the point of consumption. Here, an object is to provide a disposable food display system which may also appeal to many different users, such as by picnickers, campers, weekend guests, overflow crowds, and the like. Thus, an object is to provide such a system which may have many different uses.

Another object of the invention is to provide a general purpose display/serving system which may find an application for many different uses—where it may be necessary to display product—and not just to a display of food in such utensils.

In keeping with an aspect of the invention, these and other objects of the invention are provided by a knockdown kit or stand comprising a plurality of bent wires and molded plastic legs. Any of a number of different combinations of the bent wires may be selected and then inserted into the plastic legs, thereby forming a number of optionally different stands. This way, many sizes of stands may be knocked down and carried in individual bags, small boxes, or the like. The shapes and dimensions of the stands are selected to apply the correct amount of heat to a particular utensil when a known source of heat is used, such as the semi-solid cooking fuel sold under the trademark "Sterno".

Preferred embodiments of the invention are shown in the attached drawings, wherein:

FIG. 1 shows a knock-down kit which may be assembled to form a stand comprising an exemplary collection of bent wires and plastic legs;

FIG. 2 shows a plastic leg having the bent wires placed therein to form a corner of an exemplary stand;

FIG. 2A is a perspective view which shows a fragment of an optional bottom of a plastic leg with stabilizing receptacles therein which may or may not be used;

FIG. 7 shows the stand of FIG. 3 supporting a kettle;

FIG. 8 shows the stand of FIG. 3 supporting a coffee urn;

FIG. 8A shows a cross-section of an urn with a valve in place;

FIG. 9 shows an urn inside a corrugated cardboard box with the handles of the urn projecting beyond the box and with a cutout place for the valve to pass through when the assembled urn is set in the box.

Figure 3:
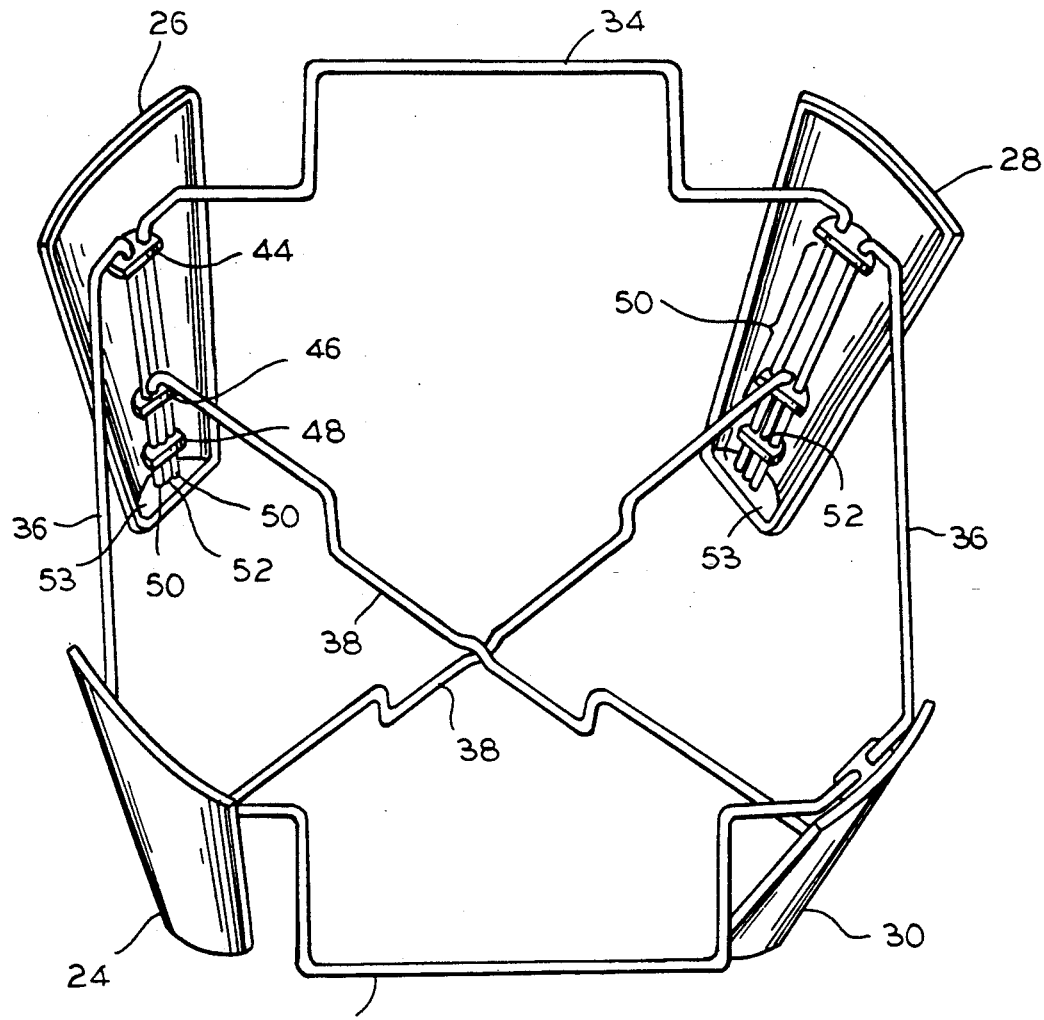
FIG. 3 shows a completely assembled one burner stand.

FIG. 1 shows a knock-down stand kit 20 of parts which incorporate the invention and which may be sold to and used by caterers, picnickers, campers, households having a party, and the like. The kit 20 includes at least four molded plastic legs 24, 26, 28, 30 and a number of bent wires 32. The bent wires 32 which are here shown include a pair of handle and side sections 34, a pair of short non-handle side supports 36, a pair of struts forming single burner supports 38, a second pair of struts forming double burner supports 40, and a pair of long side supports 42. All of these bent wires and plastic legs may be sold as a single kit; or, selected parts may be assembled and sold as one burner kits or as two burner kits. Obviously, the principle may be extended to provide any suitable kit.

FIG. 2 illustrates how the stand is assembled. On the back where it is concealed from view, each plastic leg is molded with guides or sockets 44, 46, 48 integrally formed therein at three levels. As will be observed in FIG. 1, the bent wire handle 34, and side supports 36, 42 have relatively long legs or vertical sections 50, while the burner supports 38, 40 have relatively short legs or vertical sections 52. The long legs or vertical sections 50 pass through all three guides or sockets 44, 46, 48 while the short legs or vertical sections 52 pass through only the lower two guides or sockets 46, 48 or the long legs or vertical sections might pass through only one or two of the guides or sockets, depending upon the use to which the invention is being put.

It should be noted that the back of the plastic leg 28 has a concave shape to conceal the leg section of the bent wires. The tip ends of the bent wire legs or vertical sections 50, 52 rest on the inside horizontal surface 53 of the plastic so that they will not mar the underlying supporting structure. Also, the burner support means is supported at a location in the stand which is high enough above a bottom of the stand so that heat from the burner does not mar the underlying surface. As seen in FIG. 2A, the bottom surface 53 may or may not have three recesses 51 formed therein, if desired, in order to receive, position, and stabilize the positions of the bottom tip ends of wires 50, 52. The plastic legs and bent wire legs or vertical sections 50, 52 provide the weight support function. At the top of the plastic legs 24-30, the horizontal sections of the bent wires 34, 36, 42 form a generally rectangular utensil support perimeter. Near the vertical center of the plastic legs 24-30, the horizontal sections of the wires 38, 40 are bent to form diagonal struts which extend from corner to corner across the rectangular perimeter to strengthen and give it rigidity. It should be noted that a diagonal is set at angles with respect to the members 34, 34, 36, 36 which form the utensil support. Thus, an assembly of the stand merely requires a selection of the proper bent wires and an insertion of them through the proper 44-48 sockets in the plastic legs.

FIG. 3 shows the structure of an assembled one burner stand. All four plastic legs 24-30 are held in place by the bent wires captured in sockets 44, 46, 48, and resting on support surfaces 53 at the end of the plastic legs. The burner support parts 58 (FIG. 5) of the bent wires or diagonal struts provide a recessed seat for receiving and supporting a single heating element 60. A pan receiving and support area is provided on the rectangular perimeter formed by the handle and side wires 34 and by the side support wires 36. The weight bearing support comes from both the legs or vertical portions 50 of the bent wires and the plastic legs 24-30. Thus, a pan 56 (FIG. 5) may be set on wires 34, 34, 36, 36, with the handles 34, 34 projecting far enough beyond the pan to provide means for easily lifting for moving.

Figure 4:
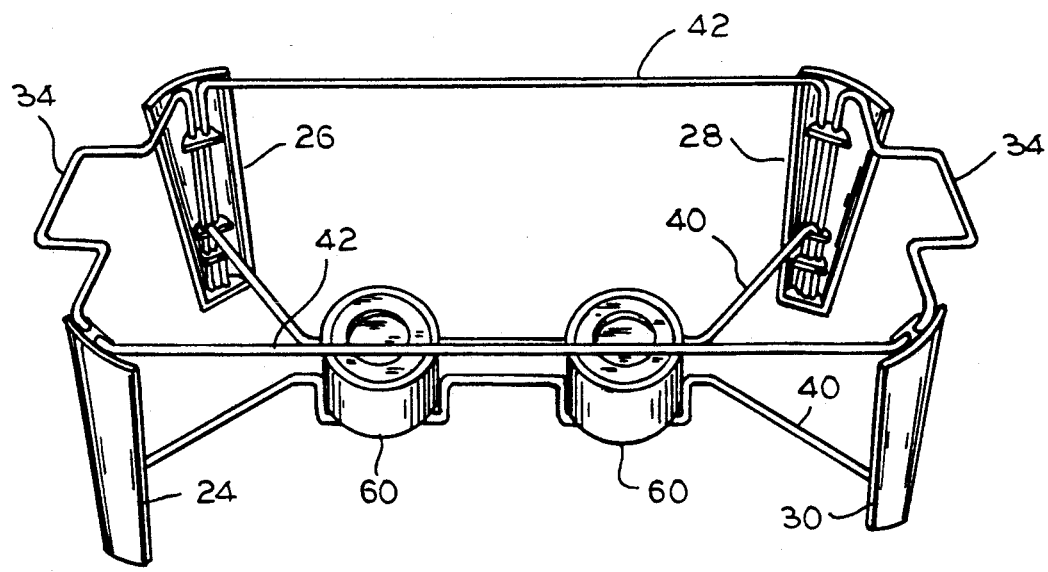
FIG. 4 shows a completely assembled two burner stand.
Figure 6:
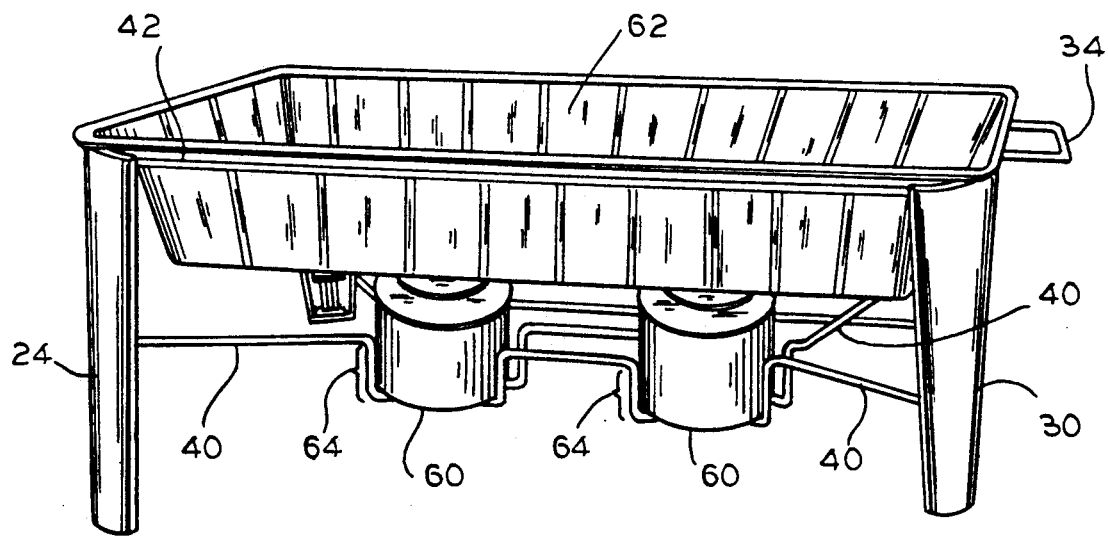
FIG. 6 shows the stand of FIG. 4 with a pan in place on it.

A two burner stand is shown in FIG. 4. The same plastic legs 24-30 and pieceparts 34 are used in this embodiment. However, the bent wires 40, 42 are longer than the corresponding parts 36, 38 in the one burner stove. The diagonal struts 40, 40 of the frame have two burner support parts 64 forming two recessed seats for receiving two heating elements 60, 60. Thus, the relatively long pan 62 (FIG. 6) is supported by the two burner stand. A pan or pans 62 rest on the rectangular perimeter provided by the bent wires forming the handles 34 and the side supports 42. Some caterers may place a smaller pan such as a two-inch deep pan inside one or more larger pans such as a two and one half inch deep pan in order to provide room for water when it is desirable to have steam associated with the food. Handles 34 project far enough beyond the sides of the pan to facilitate an easy lifting and moving. The principle may be expanded to support any suitable size pan.

Here the heating element is shown as an alcohol based product sold under the trademark "Sterno". However, other suitable devices may be used, such as candles, small stoves, or the like. Regardless of which bent wires are selected to make a stand, the heating element is supported at a location in the stand which is high enough above the bottom of the stand so that heat from the burner does not mar an underlying supporting structure (such as a table) and low enough below a top of the stand so as not to burn a product in a utensil resting on the stand. The vertical sections of the bent wires are metal reinforcements which rest upon surfaces of the plastic legs so that the metal reinforcements do not mar the table.

Figure 5:
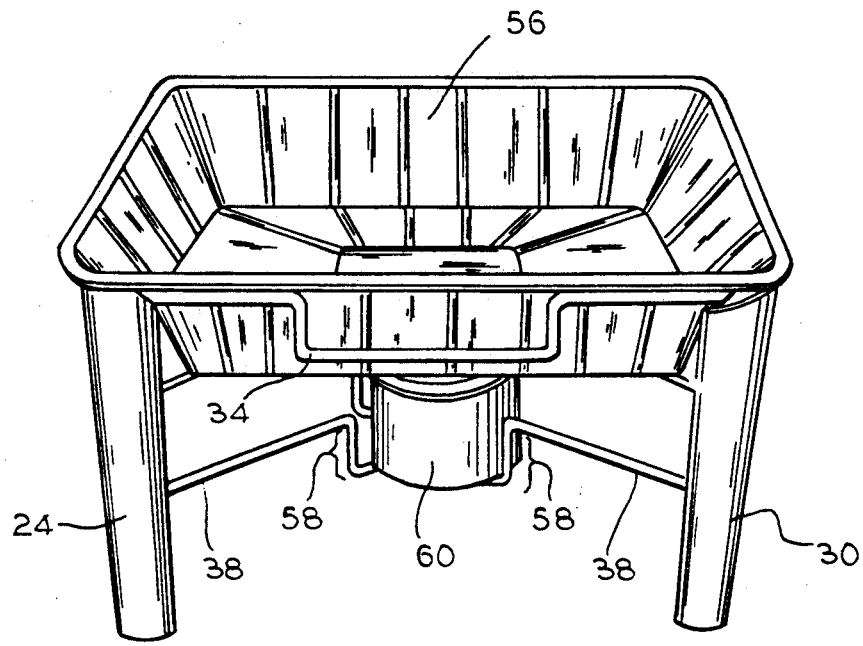
FIG. 5 shows the stand of FIG. 3 with a pan in place on it.

FIG. 7 uses a similar one burner stand that is shown in FIGS. 3, 5. Here, however, the stand supports a kettle 68 which might hold soup, chili, or the like. In this particular example, kettle 68 holds three and a half gallons, although any suitable size may be accommodated.

As shown in FIG. 8, the kettle 68 may be replaced by a kettle/urn 68 which may be approximately the same as the kettle except that there is a hole near the bottom of the urn side wall. A Tomlinson valve 70 with any suitable gasket or o-ring 71 on it may be placed in the hole in the side wall. Inside urn 68 a nut (69 (FIG. 8) is turned onto threads on the back of the valve 70, with the spout 72 of the valve facing upwardly. When the nut is finger tight, the valve 70 is rotated a half turn, thus tightening the valve and nut combination sufficiently to prevent any leakage. The length of spout 72 provides enough leverage to make a tight and leak-proof seal. Urn 68 holds four gallons, in one example, although any suitable size may be accommodated.

Handles 61 are provided on both sides of the kettle or urn to facilitate handling. As a safety measure, some special wires may be formed with no low level handles, such as 34, are provided for use with tall utensils, such as kettles and urns. A lid 69 is also provided with a vent hole 71 at the top to provide for easy transportation and to prevent a buildup of steam pressure, as best seen in FIG. 7.

An urn or kettle may be moved, shipped or transported inside a corrugated cardboard box 73 (FIG. 9). The cardboard box provides 9 thermal insulation to prevent a person from burning himself if he should lift a kettle 68 or an urn while it is filled with boiling water, for example. Also, if the urn should leak a little during shipping, as by water sloshing over the top edge 66, the cardboard box will provide a backup or secondary container. The box may have a suitable waterproof lining.

The cardboard box includes cutouts 75 through which handles 61 on the urn or kettle may project so that the box may be safely picked up and carried. A vertical slot 77 begins in an upper cover flap 79 and continues to near the bottom of the box so that the valve on the urn may pass up or down the slot.

All of the utensils (pots, pans, kettles, urns, and the like) are low cost, throw away items: Those, such as kettle 68 and urn 68, which have to withstand a heavy load such as three to four gallons of liquid, for example, are made of a metal stock which is much heavier than the foil of pans 56, 62. However, they are made in such a low cost manner that usually it is less expensive to throw them away than it is to transport them back to the kitchen, wash, and then store them. The Tomlinson valve 70 is a very low cost plastic stop cock.

In the food catering business, these utensils are of standard sizes. Therefore, the inventive stand may also be of a standard size and still be used with utensils from many different sources.

Those who are skilled in the art will readily perceive how to modify the invention. Therefore, the appended claims are to be construed to cover all equivalent structures which fall within the true scope and spirit of the invention.

The claimed invention is:

1. A known-down kit of separate and disposable parts which may be selected and assembled to form a variety of stands that supports any of a plurality of different utensils for a food display, said kit comprising a plurality of molded plastic legs, each of said legs having sockets integrally formed on one side thereof with a horizontal shelf support surface projecting on a bottom surface of said plastic leg beneath said sockets, a plurality of bent wires, of at least four of said bent wires forming four sides of an upper frame shaped perimeter of said stand and having vertical sections shaped and dimensioned to slide through said sockets and rest on said projecting support surface at the bottom of said plastic legs, whereby the load of a utensil resting on said frame is transferred at least in part through said vertical sections and bottom support surface to an under lying surface on which said stand is resting, said vertical sections thus providing mechanical supports for bearing the weight of a caterers utensil resting on said stand, at least two bent wires having downwardly projecting recess bends therein for providing a dependent means for receiving and supporting an independent cylindrical burner means, said recess bends extending down and under said burner, said at least two bent wires providing diagonal struts for extending across said perimeter and adding rigidity thereto, and each of said at least two bent wires have a vertical section on each end to slide through said sockets to a position encasing said shell, in order to fix the vertical the height of said burner.

2. The kit of claim 1 wherein said kit comprises various sizes of said bent wires which may be selected to form at least two different sizes of said stands whereby different size stands may be assembled by selecting and using certain ones of said bent wires.

3. The kit of claim 1 wherein said kit comprises at least some special bent wires with handles which may be selected to optionally form handles on certain sides of a stand.

4. The kit of claim 1 wherein said kit comprises at least some of said diagonal struts having a single set of said recess bends to provide a dependent means to receive and accommodate a single cylindrical burner and other of said diagonal struts having a plurality of said sets of recess bends to provide a pair of dependent means to receive and accommodate two cylindrical burners, whereby different numbers of burners may be accommodated by selecting different ones among said bent wires.

5. The kit of claim 1 wherein recesses are formed on said projecting support surface to receive, position, and stabilize the bottom end of said bent wires.

6. The kit of claim 1 and disposable utensils for use with said stands.

7. The kit of claim 6 wherein at least one of said utensils is a disposable aluminum pan.

8. The kit of claim 6 wherein at least one of said utensils is a kettle.

9. The kit of claim 6 wherein at least one of said utensils is a disposable urn with a hole near the bottom of a side wall, and valve means for insertion into said hole and attachment to said side all by turning said valve into a nut inside said urn, a lid means for covering said urn, said lid means having a vent hole therein to provide a venting of steam pressure from said urn, and a thermally insulating container in a form of a cardboard box, said urn being positioned inside said thermally insulating container.

10. The kit of claim 9 wherein said insulating container includes a lip flap, and a vertical slot extending through said lid flap and continuing down said box to receive said valve means on said urn as said urn is inserted into or removed from said box.

11. A knock-down stand of separate parts which may be put together in different ways to support any of a variety of utensils, said stand comprising four legs, each leg having a bottom surface which is adapted to rest upon a structure on which said stand is setting, a plurality of releasable attaching means integrally formed on each of said legs in alignment with and above said bottom surface, six bent wire means, four of said bent wire means slidably releasably joined to said attaching means and extending from leg to leg to form a utensil support near a top of said legs, said four wires forming a frame for supporting said utensil while exposing the bottom of said utensil directly to heat from a burner and another two of said bent wire means slidably releasably joined to said attaching means and extending at angles relative to said first plurality of bent wires to form burner supporting struts under said utensil support, each of said two bent wires being shaped to form a centrally located recess dependent from said to bent wires, said recess receiving and supporting at least one canned heat burner within said recess, each of at least said six bent wires terminating on its opposite ends in vertical sections which extend toward and are supported by said bottom surfaces of said vertical legs whereby said bottom surfaces support the weight of the utensil and guard against a marring of said structure.

12. The stand of claim 11 wherein said two other bent wires are shaped to form a plurality of said recesses dependent from said two wires to receive and support a plurality of said canned heat burners in said recess.

13. The stand of claim 11 and disposable utensils for use with said stand.

14. The stand of claim 11 and at least one disposable kettle for use with said stand, a hole formed near the bottom of a wall of said kettle, fluid dispensing valve means having a shape and dimension which fits through said hole, means for attaching said valve to said kettle in response to a rotational movement, said valve means having a spout which is long enough to provide leverage for giving a tightening turn to said valve means after it is in a place in said hole.

* * * * *